United States Patent
Velammal et al.

(10) Patent No.: US 11,403,536 B2
(45) Date of Patent: Aug. 2, 2022

(54) SYSTEM AND METHOD FOR ANTI-PATTERN DETECTION FOR COMPUTING APPLICATIONS

(71) Applicant: Cognizant Technology Solutions India Pvt. Ltd., Chennai (IN)

(72) Inventors: Parasu Pillai Iyappan Velammal, Chennai (IN); Duraivel Kalyanasundaram, Chennai (IN); Sriram Venkatakrishnan, Chennai (IN); Selvaraj Natarajan, Chennai (IN); Janakiraman Ramani, Chennai (IN)

(73) Assignee: COGNIZANT TECHNOLOGY SOLUTIONS INDIA PVT. LTD., Chennai (IT)

(*) Notice: Subject to any disclaimer, the term of this patent is extended or adjusted under 35 U.S.C. 154(b) by 373 days.

(21) Appl. No.: 16/835,642

(22) Filed: Mar. 31, 2020

(65) Prior Publication Data

US 2021/0182703 A1 Jun. 17, 2021

(30) Foreign Application Priority Data

Dec. 12, 2019 (IN) .............................. 201941051518

(51) Int. Cl.
*G06N 5/04* (2006.01)
*G06N 5/02* (2006.01)
(Continued)

(52) U.S. Cl.
CPC ................. *G06N 5/04* (2013.01); *G06F 8/75* (2013.01); *G06F 8/76* (2013.01); *G06N 5/02* (2013.01); *G06N 20/00* (2019.01)

(58) Field of Classification Search
CPC . G06N 5/04; G06N 20/00; G06N 5/02; G06F 8/75; G06F 8/76
See application file for complete search history.

(56) References Cited

U.S. PATENT DOCUMENTS

| | | | |
|---|---|---|---|
| 10,635,566 B1* | 4/2020 | Talluri | G06F 9/4488 |
| 2017/0177461 A1* | 6/2017 | Altman | G06F 11/0793 |
| 2021/0149788 A1* | 5/2021 | Downie | G06F 11/3604 |

OTHER PUBLICATIONS

Saluja et al., "Assessing quality by anti-pattern detection in web services" (Year: 2019).*

(Continued)

*Primary Examiner* — Phillip H Nguyen
(74) *Attorney, Agent, or Firm* — Cantor Colburn LLP

(57) ABSTRACT

A system and method for anti-pattern detection for computing application prior to deployment in cloud environment is provided. The present invention provides for applying a pre-defined set of rules on one or more applications source code. The pre-defined set of rules are applied in pre-defined order. Further, applying one or more anti-pattern detection models on one or more applications source code. The anti-pattern detection models are applied for determining correlation between one or more syntax patterns of the application source code and the anti-patterns detection models. Further, detecting anti-patterns associated with the syntax patterns of the application source code based on the pre-defined set of rules and the anti-patterns detection models. The detected anti-patterns represent unique anti-patterns. Lastly, generating a migration actionable event for the application source code based on the detected anti-patterns.

29 Claims, 6 Drawing Sheets

(51) Int. Cl.
   *G06N 20/00*   (2019.01)
   *G06F 8/75*    (2018.01)
   *G06F 8/76*    (2018.01)

(56) References Cited

OTHER PUBLICATIONS

Maiga et al., "Support Vector Machines for Anti-pattern Detection" (Year: 2012).*
Marinescu et al., "Detection Strategies: Metrics-Based Rules for Detecting Design Flaws" (Year: 2004).*
Picha et al., "Software Process Anti-pattern Detection in Project Data" (Year: 2019).*
Chen et al., "Characterizing and Detecting Anti-patterns in the Logging Code" (Year: 2017).*
Kumar et al., "An Empirical Analysis on Web Service Anti-Pattern Detection using a Machine Learning Framework" (Year: 2018).*

* cited by examiner

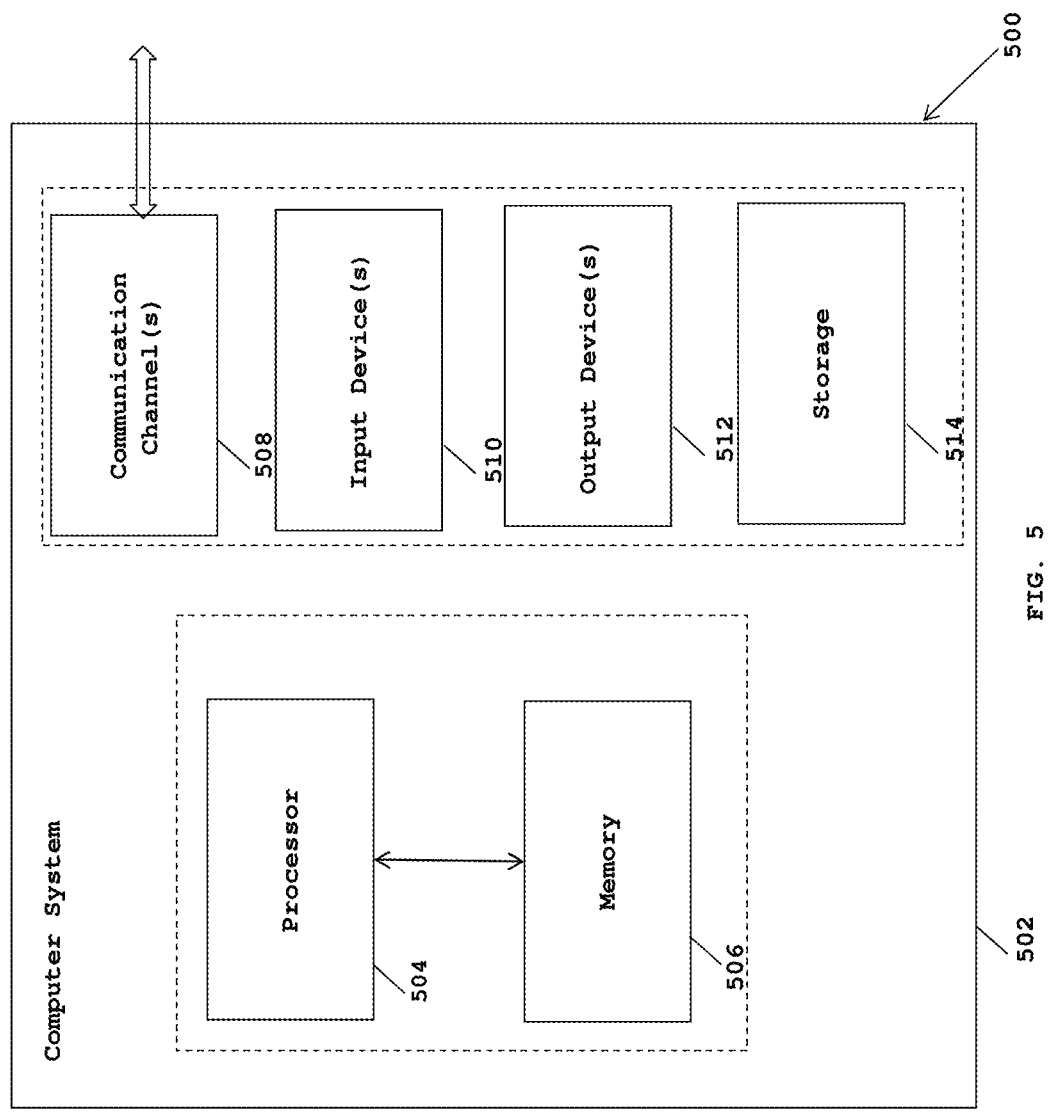

SYSTEM AND METHOD FOR ANTI-PATTERN DETECTION FOR COMPUTING APPLICATIONS

CROSS REFERENCE TO RELATED APPLICATION

This application is related to and claims the benefit of Indian Patent Application Number 201941051518 filed on Dec. 12, 2019, the contents of which are herein incorporated by reference in their entirety.

FIELD OF THE INVENTION

The present invention relates generally to the field of cloud computing. More particularly, the present invention relates to a system and a method for cloud native anti-pattern detection for computing applications by applying effective machine learning based anti-pattern detection.

BACKGROUND OF THE INVENTION

Migration of legacy applications, resources, data etc. to cloud based environment have gained a lot of popularity. Migration of applications and data to cloud based environment provides scalability, reliability and high availability. The migration of applications, resources and data to cloud environment is typically carried out in two phases which includes an assessment phase and an actual migration phase. Further, in order to carry out actual migration phase for an application, the assessment phase which is carried out prior to migration, plays an essential role. The assessment phase involves determining migration strategy for portfolio of applications and determining migration strategy for each application. The assessment phase, therefore, provides a report for an application with respect to the cloud migration requirements and readiness.

It has been observed that the assessment phase is a time consuming process. A developer or a software architect, operating manually, may have to analyze each application himself for cloud migration requirements and readiness based on multiple application factors and components utilized in an application. Further, multiple applications of different sizes are analyzed for determining cloud migration requirements and readiness. Typically, the size of the application is determined by lines of code (LOC) of the application. It has been observed that an application with LOC more than $10^5$ may require at least a week's time for completing the assessment, consequently, making the assessment phase slow and error prone.

The assessment phase may further be carried out automatically utilizing various tools that aid in generating cloud requirements and readiness report for an application. However, conventionally, such tools operate only on pre-defined set of rules for cloud requirements and readiness assessment report generation for an application. Typically, the assessment report is based on pre-defined rules, and tools implementing such rules are incapable of automatically learning, extending and identifying anti-patterns in an application for cloud migration. It has been observed that incapability of existing tools to learn anti-patterns in an application results in inaccurate and low anti-pattern recognition and detection. The developer or software architect may have to manually check for various anti-patterns in an application, therefore reducing the effectiveness of inference drawn from the assessment report. Further, customization of the pre-defined rules is typically a complex process and therefore, developers and software architects may not be able to modify such pre-defined rules according to their needs and requirements. Furthermore, it has been observed that the tools utilized for cloud requirements and readiness assessment report generation are not secure as they store the assessment report in a storage at their end.

In light of the aforementioned drawbacks, there is a need for a system and a method which provides efficient cloud migration report generation associated with requirements for an application and anti-pattern detection in an automated manner. There is a need for a system and a method which provides cloud migration assessment report generation for multiple applications in minimum time without any human intervention. Furthermore, there is a need for a system and a method which provides accurate generation of assessment report for an application in a secure and a cost effective manner.

SUMMARY OF THE INVENTION

In various embodiments of the present invention, a system for anti-pattern detection for a computing application prior to deployment in a cloud environment is provided. The system comprising a memory storing program instructions, a processor configured to execute instructions stored in the memory and an application assessment subsystem executed by the processor. The application assessment subsystem is configured to apply a pre-defined set of rules on one or more applications source code. The pre-defined set of rules are applied in a pre-defined order. Further, the application assessment subsystem is configured to apply one or more anti-pattern detection models on the one or more applications source code. The anti-pattern detection models are applied for determining a correlation between one or more syntax patterns of the application source code and the anti-patterns detection models. Further, the application assessment subsystem is configured to detect anti-patterns associated with the one or more syntax patterns of the application source code based on the pre-defined set of rules and the anti-patterns detection models. The detected anti-patterns represent unique anti-patterns. Lastly, the application assessment subsystem is configured to generate a migration actionable event for the application source code based on the detected anti-patterns.

In various embodiments of the present invention, a method for anti-pattern detection for a computing application prior to deployment in a cloud environment is provided. The method is implemented by a processor executing instructions stored in a memory. The method comprises applying, by the processor, a pre-defined set of rules on one or more applications source code. The pre-defined set of rules are applied in a pre-defined order. The method further comprises applying, by the processor, one or more anti-pattern detection models on the one or more applications source code. The anti-pattern detection models are applied for determining a correlation between one or more syntax patterns of the application source code and the anti-patterns detection models. Further, the method comprises detecting, by the processor, anti-patterns associated with the one or more syntax patterns of the application source code based on the pre-defined set of rules and the anti-patterns detection models. The detected anti-patterns represents unique anti-patterns. Lastly, the method comprises generating, by the processor, a migration actionable event for the application source code based on the detected anti-patterns.

In various embodiments of the present invention, computer program product is provided. The computer program product comprises a non-transitory computer-readable medium having computer-readable program code stored thereon, the computer-readable program code comprising instructions that, when executed by a processor, cause the processor to apply a pre-defined set of rules on one or more applications source code. The pre-defined set of rules are applied in a pre-defined order. Further, one or more anti-pattern detection models are applied on the one or more applications source code. The anti-pattern detection models are applied for determining a correlation between one or more syntax patterns of the application source code and the anti-patterns detection models. Further, anti-patterns associated with the one or more syntax patterns of the application source code are detected based on the pre-defined set of rules and the anti-patterns detection models. The detected anti-patterns represents unique anti-patterns. Lastly, a migration actionable event is generated for the application source code based on the detected anti-patterns.

BRIEF DESCRIPTION OF THE ACCOMPANYING DRAWINGS

The present invention is described by way of embodiments illustrated in the accompanying drawings wherein:

FIG. 5 illustrates an exemplary computer system in which various embodiments of the present invention may be implemented.

DETAILED DESCRIPTION OF THE INVENTION

The present invention discloses a system and a method for efficient cloud migration report generation for an application in an automated manner. The present invention provides for cloud migration assessment report generation associated with requirements of an application. The present invention provides for cloud migration assessment report generation for multiple applications in minimum time without any human intervention. The present invention further provides for easily customizable pre-defined rules that are utilized in the assessment report generation in accordance with needs and requirements of the developers and software architects. Further, the present invention provides for an in-built self-learning intelligent mechanism for automatic detection of anti-patterns related to various applications in order to provide efficient and effective cloud migration assessment report generation. Furthermore, the present invention provides options for updating anti-patterns repository. Furthermore, the present invention provides cloud migration assessment report generation in a secure and cost effective manner.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
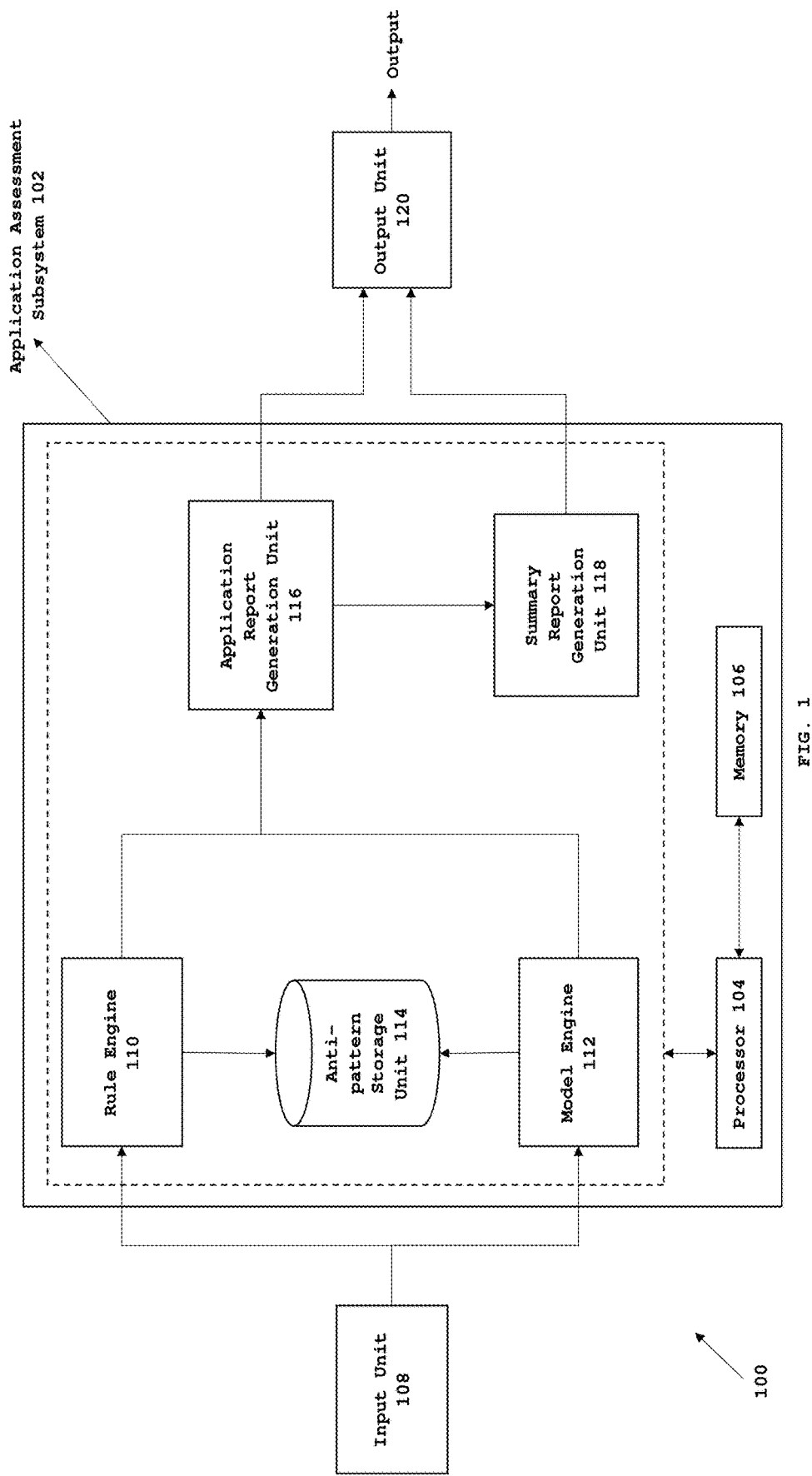
FIG. 1 is a block diagram of a system for anti-pattern detection, in accordance with various embodiments of the present invention.

FIG. 1 is a block diagram of a system 100 for anti-pattern detection, in accordance with various embodiments of the present invention. Referring to FIG. 1, in an embodiment of the present invention, the system 100 comprises an input unit 108, an application assessment subsystem 102 and an output unit 120.

In an embodiment of the present invention, the input unit 108 is configured to provide one or more applications source code to the application assessment subsystem 102 for assessment report generation. The input unit 108 may include, but is not limited to, a graphical user interface (GUI), an application programming interface (API), a computer system, a laptop, a tablet etc. In operation, an application source code associated with an application, for which the assessment report is to be generated, is input via the input unit 108 in a pre-defined file format. Further, multiple applications source codes may be input via the input unit 108. The pre-defined file format may include, but is not limited to, a Zip format. The applications input to the application assessment subsystem 102 via the input unit 108 may be in the form of a particular computer programming language such as, but is not limited to, Java, .Net, PHP, Python, C++, Node.js etc.

In an embodiment of the present invention, the application source code is received by the application assessment subsystem 102 from the input unit 108. The subsystem 102 is configured with a built-in intelligent mechanism for automatically analyzing the application source code, applying a pre-defined set of rules and models on the application source code, detecting anti-patterns related to the application source code, generating the assessment report relating to the cloud migration requirements of an application. The application assessment subsystem 102 comprises multiple components and units which work in conjunction with each other for effectively detecting the anti-patterns present in the application source code. The multiple components and units of the subsystem 102 are operated via a processor 104 specifically programmed to execute instructions stored in a memory 106 for executing respective functionalities of the components and units of the subsystem 102 in accordance with various embodiments of the present invention.

In an embodiment of the present invention, the subsystem 102 is positioned at the user's (e.g. developer or software architect) location. In an exemplary embodiment of the present invention, the subsystem 102 may be configured by the user at his location via a user interface (UI) such as, a web portal connecting the user to a subsystem 102 hosting platform such as, a pivotal cloud foundry (PCF) etc. The user may install the subsystem 102 accessed via the web portal at his location in a computer device, a laptop, a tablet etc. In another exemplary embodiment of the present invention, the subsystem 102 is downloadable as a jar file.

In another embodiment of the present invention, the subsystem 102 may be implemented in a cloud computing architecture in which data, applications, services and other resources are stored and delivered through shared datacenters. In an exemplary embodiment of the present invention, the functionalities of the subsystem 102 are delivered to a user as software as a service (SaaS) over a communication network.

In another embodiment of the present invention, the subsystem 102 may be implemented as a client-server architecture. In this embodiment of the present invention, a client terminal accesses a server hosting the subsystem 102 over a communication network. The client terminals may include, but are not limited to, a smart phone, a computer, a tablet, microcomputer or any other wired or wireless terminal. The server may be a centralized or a decentralized server.

In an embodiment of the present invention, the application assessment subsystem 102 comprises a rule engine 110, a model engine 112, an anti-pattern storage unit 114, an application report generation unit 116 and a summary report generation unit 118.

In an embodiment of the present invention, the rule engine 110 of the subsystem 102 is configured to receive the application source code in the pre-defined file format from the input unit 108. The application source code provided in a pre-defined file format may comprise multiple files associated with the application source code. The rule engine 110 is configured to apply one or more pre-defined set of rules on the received application source code for processing and subsequently analyzing the application source code. The pre-defined set of rules are representative of regular expression (ReGex) rules. The ReGex rules are applied on the application source code for determining occurrence of a particular syntax pattern in a source code that may be representative of an anti-pattern. Anti-patterns are representative of a problem or issue associated with the application source code which may obstruct the migration of the said application to cloud environment. Further, the ReGex rules may be classified as anti-pattern rules, technical stack suitability rules and technical stack summary rules. Further, the user may update the pre-defined rules according to his needs and requirements. For example, a user may choose to customize a file system-write operation, which is typically a high-severity anti-pattern. Therefore, at the time of customization, a user may provide less priority to the file system-write operation, if the user has alternate solution to resolve the said anti-pattern outside the scope of the application. The pre-defined set of rules are stored in a storage unit (not shown) present in the rule engine 110.

In operation, in an embodiment of the present invention, the rule engine 110 is configured to iterate through each file associated with the application source code which is provided in the pre-determined file format by applying the pre-defined set of rules (ReGex rules). The rule engine 110 is configured to firstly assess each file associated with the application source code and subsequently exclude non-text file types associated with the application source code by applying exclusion logic. The non-text file types may include, but are not limited to, image files, binary files etc. Further, the excluded file types are representative of files which does not comprise any source code reference and therefore are not assessed. The rule engine 110 is further configured to apply the pre-defined set of rules (ReGex rules) in a pre-defined order on the remaining file types after excluding the non-text file types.

In an exemplary embodiment of the present invention, the rule engine 110 is configured to, firstly, apply anti-pattern rules on the application source code files for assessing the source code for detecting the anti-patterns occurring in the said source code. For example, the anti-pattern data occurring in the source code may include, but is not limited to, http session (http(s)), session.write (s.write), session.read (s.read) etc. Secondly, the rule engine 110 is configured to further apply technical stack suitability rules on the application source code files. The technical stack suitability rules aids in determining the extent to which an application's technical stack may be migrated to cloud. Therefore, if the technical stack suitability is measured in percentage based on the technical stack suitability rules, then higher percentage indicates that the application's technical stack may be easily migrated to cloud. The technical stack suitability rules assess the application source code files based on a pre-defined suitability criteria. The pre-defined suitability criteria is based on the technical details of the application source code. The technical suitability criteria aids in determination of the technical suitability of an application for cloud migration with respect to different technical parameters. Further, each technical parameter in the suitability criteria comprises a pre-defined base weight associated with a scale of 100 points. The technical stack suitability criteria may be assessed in the form of high, medium and low technical suitability criteria. For example, an application may be based on a java programming language. In the said application, one of the technical parameters may relate to java runtime with respect to other parameters. The java runtime parameter with respect to other parameters may be assigned a base weight of 6 points out of the scale of 100 points. Therefore, if an application has java runtime version less than or equal to 1.6, then suitability criteria is considered to be low and 0% of base weight (i.e. 0 points) is assigned for suitability criteria. If, the application has java runtime version equal to 1.7, then suitability criteria is considered to be medium and 50% of base weight (i.e. 3 points) is assigned for suitability criteria. If, the application has java runtime version greater than 1.7, then suitability criteria is considered to be high and 100% of base weight (i.e. 6 points) is assigned for suitability criteria. Lastly, the rule engine 110 is configured to apply technical stack summary rules in order to generate technical summary data of the application source code. The technical summary of the application source code may include, but is not limited to, primary and supporting frameworks, third party libraries, representational state transfer (REST) interfaces, simple object access protocol (SOAP) interfaces, application details, LOC number, number of java files, number of test cases etc. Further, the rule engine 110 is configured to assemble the detected anti-patterns data, the tech stack suitability criteria data and the tech stack summary data and generate a first report as a JavaScript Object Notation (JSON) report comprising the anti-pattern data, the tech stack suitability criteria data and the tech stack summary data.

In an embodiment of the present invention, the model engine 112 of the application assessment subsystem 102 is configured to receive the application source code in the pre-defined file format, i.e. Zip format, from the input unit 108 comprising multiple files related to the application source code. The text files associated with the application source code are processed by the model engine 112 and non-text files are excluded by the model engine 112. The model engine 112 is configured with built-in intelligent mechanism for determining anti-patterns occurring in various applications source code. The model engine 112 is configured to apply various cognitive techniques on the application source code files for detecting anti-patterns occurring in application source code. The cognitive techniques applied may include, but are not limited to, machine learning, deep learning, pattern recognition etc. In an embodiment of the present invention, the model engine 112 determine the anti-patterns, computes a 'confidence factor' and subsequently generates a second report as a JavaScript Object Notation (JSON) report comprising the determined anti-patterns and the computed 'confidence factor'. The model engine 112 is explained in detail in conjunction with FIG. 2 in later part of the specification.

Figure 3:
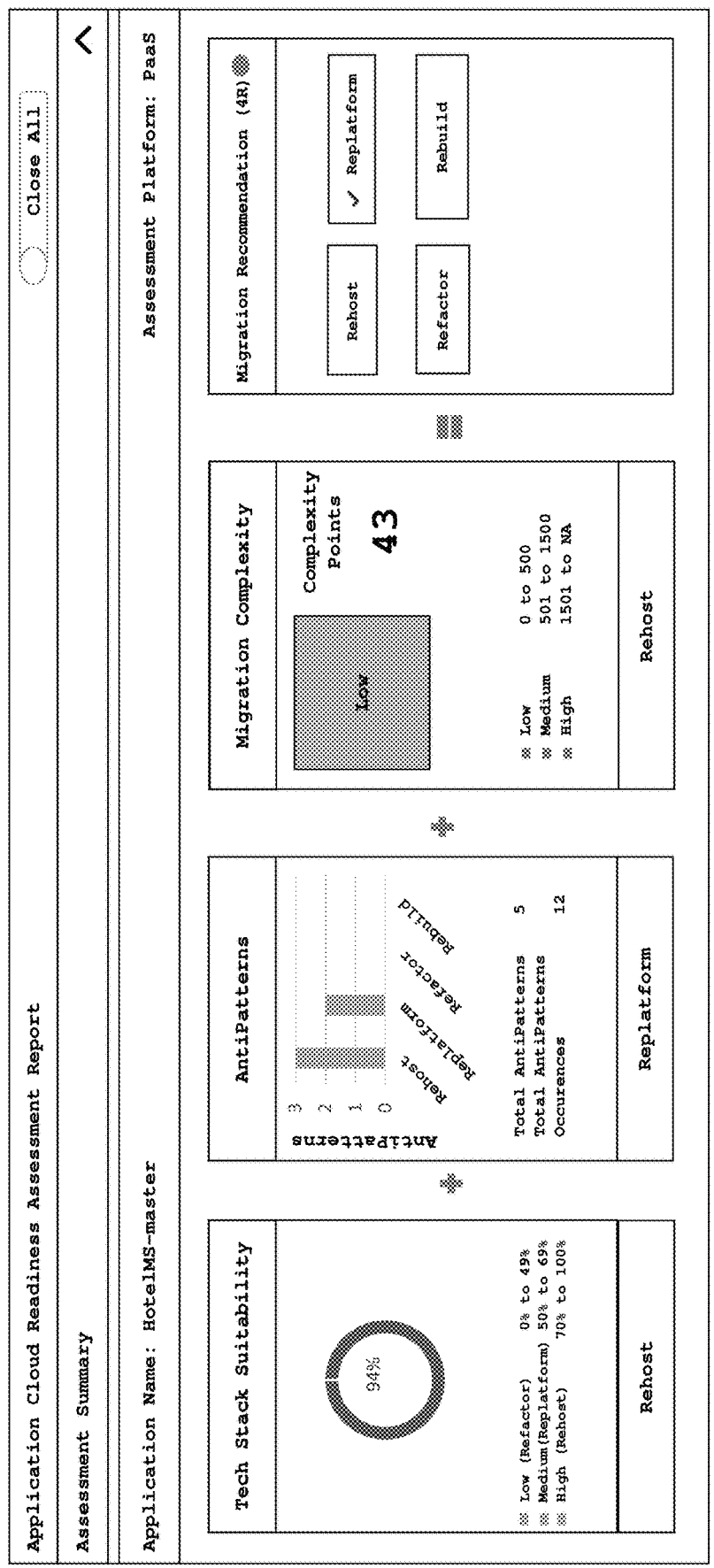
FIG. 3 is a screenshot illustrating an application cloud readiness assessment report, in accordance with various embodiments of the present invention.

In an embodiment of the present invention, the application assessment subsystem 102 is configured to combine the first JSON report and the second JSON report. The first JSON report and the second JSON report is scanned prior to being combined by the application assessment subsystem 102 in order to prevent duplication of anti-patterns, that may have occurred in both the JSON reports. The combined first and second JSON reports are subsequently fed to the application report generation unit 116. The JSON reports relates to different applications, which are programmed utilizing different computer programming languages, providing detected anti-patterns. The application report generation unit 116 is configured to assess the received first and second JSON reports and generate an individual detailed third report for every application providing the unique anti-patterns detected across the source code of the application. The third report for each application is generated in a pre-determined format such as, but is not limited to, a hypertext markup language (HTML) format. The third report generated by the application report generation unit 116 provides an application level assessment view. The application level assessment for each application provides an individual report for each application via the output unit 120. The output unit 120 may include, but is not limited to, a GUI, an API, a computer system, a tablet, a smart phone etc. The generated third report for each application providing detected anti-patterns across each application may be viewed by the user on a dashboard as illustrated in FIG. 3. Further, the third report as illustrated in FIG. 3 provides a technical stack suitability based on the technical details of the application (low, medium or high); migration complexity based on anti-patterns and severity (low, medium or high) based on the impact of an anti-pattern on an application during cloud migration (e.g. an anti-pattern which leads to failure of migration of an application to cloud is marked with high severity), non-adherence to cloud native twelve factor principles, anti-pattern 'confidence factor' and migration actionable event. In an exemplary embodiment of the present invention, the application report generation unit 116 is configured to generate a migration actionable event, provided in the third report, based on the detected anti-patterns for the application source code. The migration actionable event may include, but is not limited to, a first event, a second event, a third event and a fourth event. The first event includes rehosting, in which some configuration changes may be carried out in the application source code. The second event includes replatform, in which minimum code change may be carried out in the application source code. Further, the third event includes refactor, in which significant code changes may be carried out in the application source code. Further, the fourth event includes rebuild, in which the application source code may not be reused and subsequently new application source code may be written for migrating the application source code to the cloud platform.

In another embodiment of the present invention, the application report generation unit 116 is further configured to feed the generated third report to the summary report generation unit 118. The summary report generation unit 118 is configured to process each third report relating to the anti-patterns detected across the source code of the application and generates a fourth report (summary report) for multiple applications providing statistics of the anti-patterns detected across individual application source code. The fourth report is generated in the pre-determined format such as, but is not limited to, the hypertext markup language (HTML) format. The fourth report generated by the summary report generation unit 118 provides a portfolio level assessment view. The portfolio level assessment provides the summary report generated by the summary report generation unit 118 for multiple applications together via the output unit 120. Further, the third report and the fourth report generated by the application report generation unit 116 and the summary report generation unit 118 respectively includes a detailed anti-pattern summary which further includes, but is not limited to, a file name, specific line number of the source code in which the anti-pattern may occur, an anti-pattern description and location of the file. Further, the user via the output unit 120 may review the detected anti-patterns provided in the third report and the fourth report.

In an embodiment of the present invention, the application assessment subsystem 102 is customizable by the user. The application assessment subsystem 102 provides capability to the user to customize the pre-defined rules stored in the rule engine 110 and anti-pattern detection models stored in the model engine 112 based on his needs and requirements. For example, despite the java database connectivity (JDBC)-connection strings being pre-defined as an anti-pattern model in the model engine 112, the said anti-pattern may be custom implemented by a user with respect to an organization. Therefore, in such scenarios the pre-defined JDBC-connection strings anti-pattern model in model engine 112 may be insufficient. Then, the user may provide a sample and define the custom implemented JDBC-connection strings anti-patterns model as a custom model for detecting anti-patterns according to his organization's needs and requirements. The user may add new pre-defined set of rules or update the existing pre-defined set of rules present in the rule engine 110 via the input unit 108. Further, the application assessment subsystem 102 is configured to provide capability for training the generated anti-pattern detection models such that the anti-patterns data occurring in the application source code is provided via the input unit 108. The training data may be provided such as, but is not limited to, the anti-patterns occurring in a sample application source code, a code snippet editor if no sample application is available, one or more code snippets etc. In an embodiment of the present invention, the anti-pattern storage unit 114 is configured to store the data provided by the user for customization, which may include, but is not limited to, new pre-defined set of rules, updated pre-defined set of rules, training data, anti-patterns in a sample application source code, one or more code snippets etc.

Figure 2:
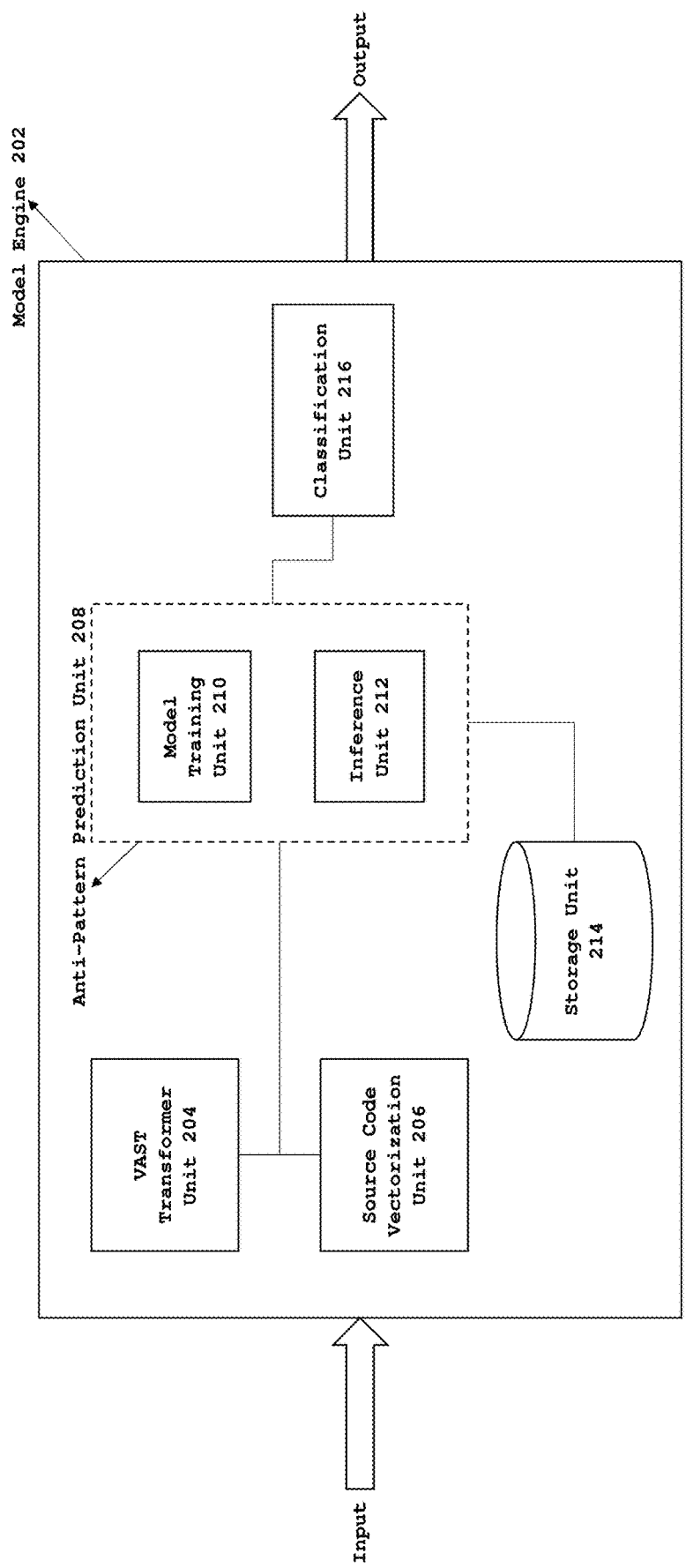
FIG. 2 is a detailed block diagram illustrating a model engine, in accordance with an embodiment of the present invention.

FIG. 2 is a detailed block diagram illustrating a model engine 202. Referring to FIG. 2 the model engine 202 comprises multiple units which work in conjunction with each other for effectively detecting the anti-patterns present in the application source code. The multiple units of the model engine 202 are operated via the processor 104 (FIG. 1) (not shown) specifically programmed to execute instructions stored in a memory 106 (FIG. 1) (not shown) for executing respective functionalities of the units of the model engine 202 in accordance with various embodiments of the present invention.

In an embodiment of the present invention, the model engine 202 comprises a value stream abstract syntax tree transformer (VAST transformer) unit 204, source code vectorization unit 206, an anti-pattern prediction unit 208, a storage unit 214 and a classification unit 216. Further, the anti-pattern prediction unit 208 comprises a model training unit 210 and an inference unit 212.

In an embodiment of the present invention, the value stream abstract syntax tree (VAST) transformer unit 204 of the model engine 202 is configured to iterate through each file present in the pre-defined file format of the application source code received by the model engine 202. The VAST transformer unit 204 is configured with multiple VAST transformers which are based on various programming languages, such as, but are not limited to, java based VAST transformer, XML based VAST transformer, etc. The VAST transformer unit 204 is configured to parse (break) the application source code syntax patterns present in each file into one or more lexical tokens associated with the specific programming language by utilizing techniques such as, but are not limited to, one-hot encoding etc. Every token is configured with an application syntax type identifier. For example, the source code syntax tokens may include, but are not limited to, field tokens, declaration tokens, method expression tokens, alphabetic tokens, punctuation tokens, literal tokens, identifier tokens, separator tokens, operator tokens etc. Therefore, the lexical tokens are representative of a sequence or a string of source code syntax patterns, which are subsequently unified in a common standard format by the VAST transformer unit 204. For example, a programming language specific lexical token may be unified in a standard format comprising pre-defined number of fields such as, type field, value field, file name field and lines of code field. For instance, if a lexical token is java specific, then standard format may comprise type field as method declaration, value field as getText, file name field as x.java and line of code as 15 or if a lexical token is XML specific, then standard format may comprise type field as XML element, value field as xyz, file name field as x.xml and line of code as 12. Further, the tokenization process is agnostic of the type of programming language utilized for creation of the application source code. For example, the application source code may be in a java programming language, .Net programming language, PHP programming language etc., the tokens formed are therefore configured to a unified standard format. Further, the VAST transformer unit 204 is configured to attach metadata with the formed source code lexical tokens for providing the context of a particular token. For example, in a java based application, a method A may be invoked by a method B, then the lexical token for method A may include meta data that specifies the invoking method as B.

In an embodiment of the present invention, the output of the VAST transformer unit 204 comprising the lexical tokens is fed to the source code vectorization unit 206 by the model engine 202. The source code vectorization unit 206 is configured to determine the frequency of occurrence of every token. The lexical tokens along with the frequency of occurrence is represented as a vector data type. In an embodiment of the present invention, a bag of words model is formed by the source code vectorization unit 206 representing the frequency of occurrence of different types of syntax patterns. In an exemplary embodiment of the present invention, syntax patterns may include characters occurring in the sequence of standard unified format tokens. The bag of words model is utilized to persist the trained anti-patterns. Further, the source code vectorization unit 206 is configured to bag the words in the form of a matrix comprising a pre-determined number of rows and columns. The matrix is a representation of a table illustrating all the similar lexical tokens bagged together with frequency of their occurrence in the standard unified token vector. For example, if a token comprises an alphabetical character 'a' operator which is present in the application source code and it occurs 3 times in the standard unified token vector, then in the matrix where the character 'a' is placed, the frequency of its occurrence as number 3 is mapped to its location in the matrix. The anti-patterns occurring in the matrix are tagged against the characters present in the matrix by the source code vectorization unit 206 based on a pre-defined set of anti-patterns.

In operation, in an embodiment of the present invention, the output of the source code vectorization unit 206 comprising the tagged anti-patterns in the matrix form are fed to the model training unit 210 of the anti-pattern prediction unit 208. The model training unit 210 of the anti-pattern prediction unit 208 is configured to apply machine learning technique such as, but is not limited to, natural language processing (NLP) on each lexical token vector present in the matrix for determining the type of character associated with each token. The model training unit 210 is configured to train and generate multiple anti-patterns detection models utilizing supervised machine learning techniques such as, but are not limited to, three-layer deep neural network (DNN) etc. based on the fed anti-patterns in the matrix form. The models are generated utilizing an anti-pattern library, such as, but is not limited to, tensor-flow. The models generated are binary models. The models are representative of various anti-patterns associated with various application source codes. The trained models formed are thereafter utilized during assessment for detecting the anti-patterns occurring in the application source code. Further, the trained and generated anti-patterns detection models are stored in the storage unit 214 for future retrieval.

In an embodiment of the present invention, the inference unit 212 of the anti-pattern prediction unit 208 is invoked by the model engine 202 during the assessment phase for detecting the anti-patterns occurring in the application source code, when the source code is fed to the model engine 202 via the input unit 108 (FIG. 1). Further, the inference unit 212 is configured to invoke the storage unit 214 for fetching the generated and trained anti-patterns detection models. The inference unit 212 is configured to utilize the fetched anti-patterns detection models for detecting the anti-patterns occurring in the application source code. In an embodiment of the present invention, the inference unit 212 is further configured to invoke the VAST transformer unit 204 and the source code vectorization unit 206 for generating vectorized lexical tokens based on the source code associated with the application which is being assessed. The inference unit 212 is subsequently configured to compute similarity of the syntax patterns occurring in the application source code by comparing the vectorized lexical tokens of the application source code with the anti-patterns detection models for determining the anti-patterns occurring in the application source code. Therefore, the inference unit 212 is configured to compute a correlation between the syntax patterns occurring in the application source code and the anti-pattern models. The inference unit 212 utilizes a comparison technique, such as, but is not limited to, fuzzy match algorithm technique etc. for determining the correlation between the syntax patterns occurring in the application source codes and the anti-pattern models. Consequently, if a correlation is detected between a syntax pattern in the application source code and the anti-pattern models, then the correlated syntax pattern in the application source code is tagged as an anti-pattern and other syntax patterns for which no correlation is determined are tagged as not an anti-pattern by the inference unit 212.

Further, the inference unit 212, subsequent to computation of the correlation, is configured to compute a 'confidence factor'. The inference unit 212 utilizes the generated and trained anti-pattern models for computing the 'confidence factor'.

In an embodiment of the present invention, the classification unit 216 is configured to compare the computed 'confidence factor' to a pre-defined threshold 'confidence factor' for tagging the correlated syntax patterns as anti-patterns. The 'confidence factor' is representative of the extent of similarity of the correlated syntax pattern as anti-patterns and is provided in a percentage numeric form. For example, if the threshold 'confidence factor' is pre-defined as 90% and the inference unit 212 computes the 'confidence factor' between the correlated syntax patterns as 91%, then the correlated syntax pattern present in the application source code is tagged as an anti-pattern. If the 'confidence factor' is between 50%-80%, then there is a likely chance of the correlated syntax pattern of being an anti-pattern. However, if the 'confidence factor' is 30%, then the correlated syntax pattern is not tagged as an anti-pattern as it is quite below the threshold 'confidence factor'. Therefore, the classification unit 216 predicts whether the detected anti-patterns are anti-patterns or not.

Advantageously, in accordance with various embodiments of the present invention, the system 100 is configured to efficiently generate the cloud migration assessment report for an application by effectively determining the anti-patterns occurring in the application source code in an automated manner utilizing a combination of pre-defined set of rules and deep neural network based models for anti-pattern detection. The system 100 is configured to generate the cloud readiness assessment report for multiple applications in an automated manner and in a reduced time without any human intervention. The system 100 is configured with an in-built intelligent mechanism, which is capable of learning and detecting the anti-patterns occurring in the application source code. Furthermore, the system 100 is configured to provide a secure cloud migration assessment report generation environment as it operates completely in an offline mode and locally on the user's end in a cost effective manner.

Figure 4:
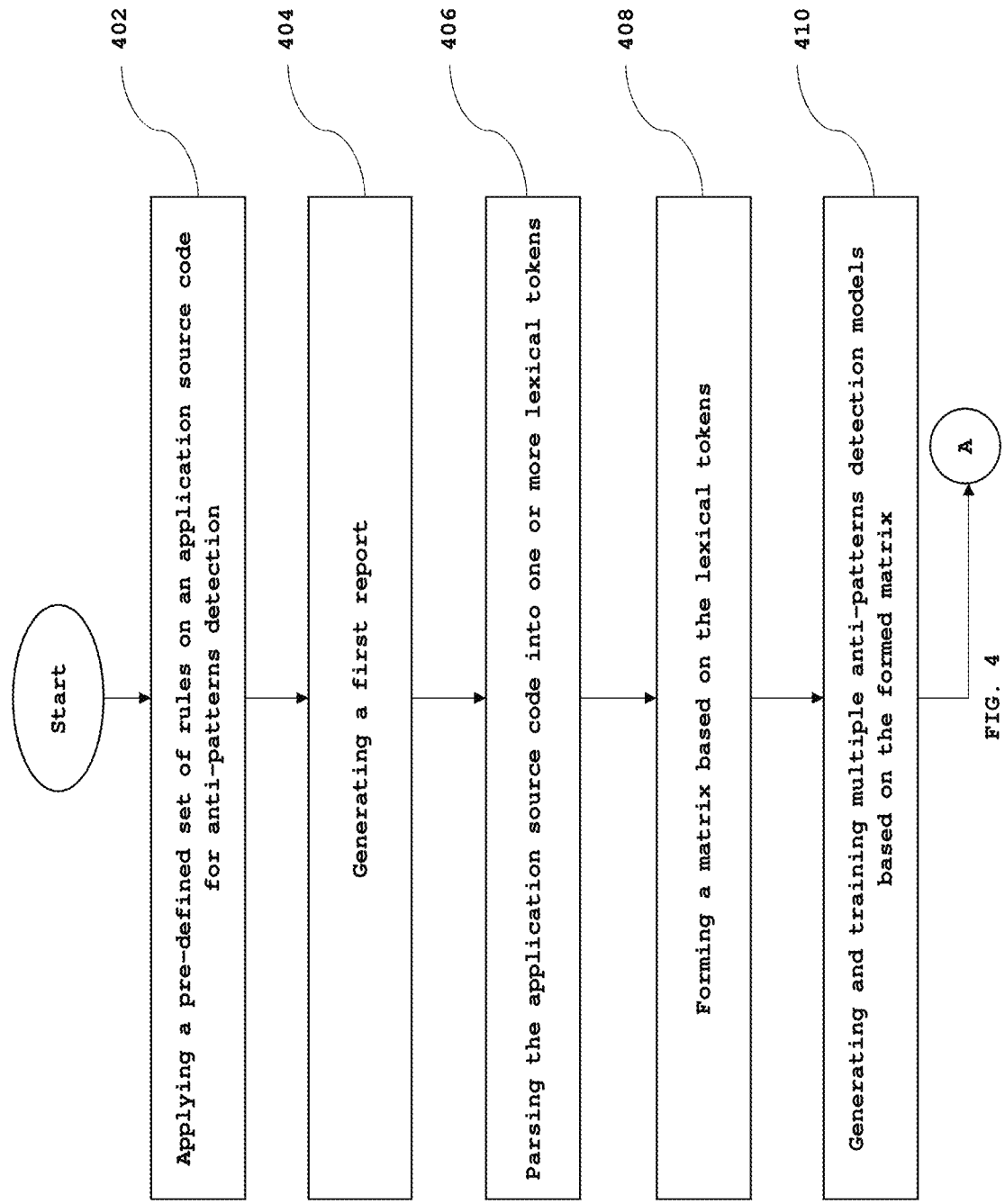
FIG. 4 and FIG. 4A is a flowchart illustrating a method for anti-pattern detection, in accordance with various embodiments of the present invention.
Figure 4A:
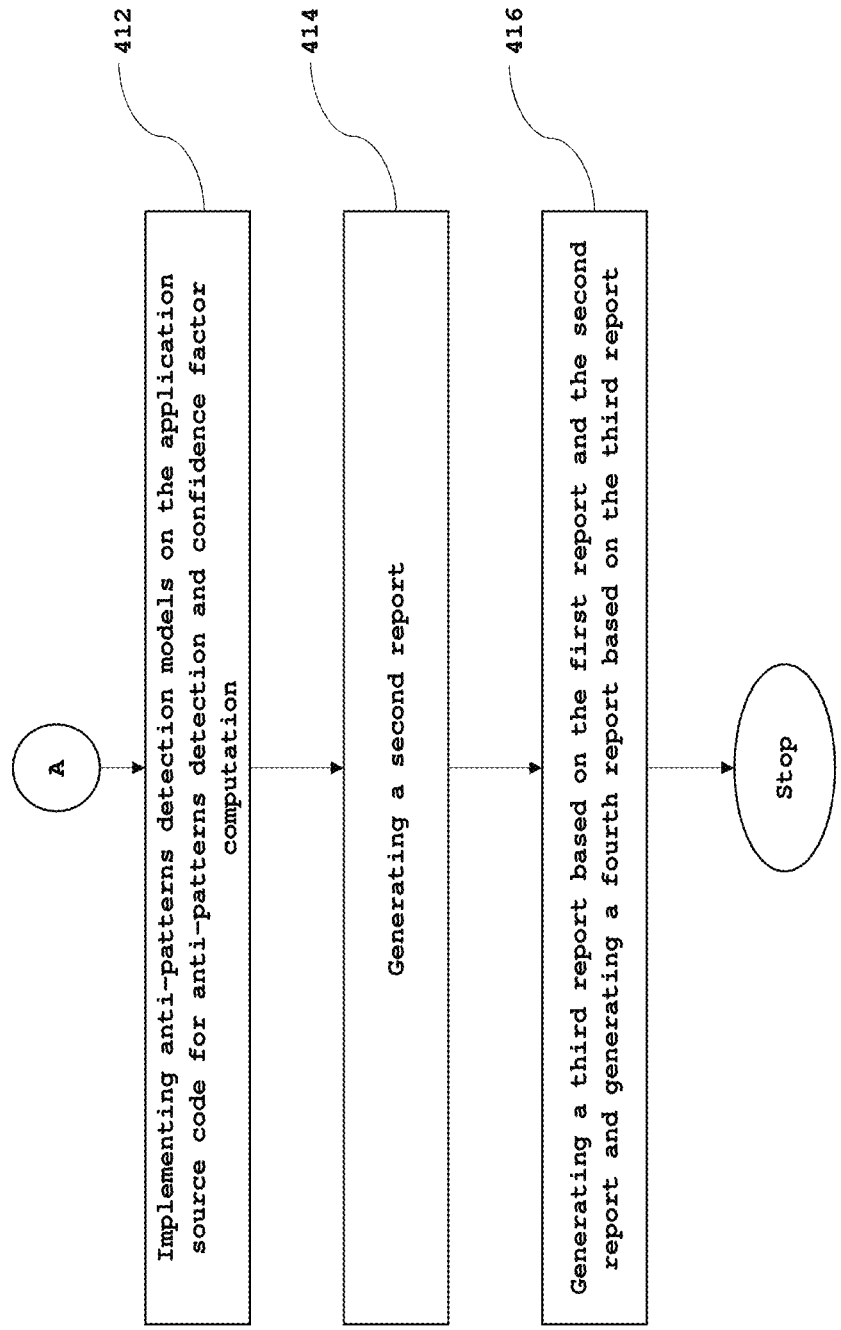

FIG. 4 and FIG. 4A is a flowchart illustrating a method for anti-patterns detection, in accordance with various embodiments of the present invention.

At step 402, a pre-defined set of rules are applied on the application source code for anti-patterns detection. In an embodiment of the present invention, in operation, an application source code associated with an application for which the assessment report is to be generated is input in a pre-defined file format. Further, multiple applications source codes may be input. The pre-defined file format may include, but is not limited to, a Zip format. The applications may be in the form of a particular computer programming language such as, but is not limited to, Java, .Net, PHP, Python, C++, Node.js etc.

In an embodiment of the present invention, the application source code provided in the pre-defined file format may comprise multiple files associated with the application source code. The one or more pre-defined set of rules are applied on the received application source code for processing and subsequently analyzing the application source code. The pre-defined set of rules are representative of regular expression (ReGex) rules. The ReGex rules are applied on the application source code for determining the occurrence of a particular syntax pattern in a source code that may be representative of an anti-pattern. Anti-patterns are representative of a problem or issue associated with the application source code which may obstruct the migration of the said application to cloud environment. Further, the ReGex rules may be classified as anti-pattern rules, technical stack suitability rules and technical stack summary rules. Further, the user may update the pre-defined rules according to his needs and requirements. For example, a user may choose to customize a file system-write operation, which is a typical high-severity anti-pattern. Therefore, at the time of customization a user may provide less priority to the file system-write operation for anti-pattern resolution, if the user has alternate solution to resolve the said anti-pattern outside the scope of the application. The pre-defined set of rules are stored in a storage unit.

In operation, in an embodiment of the present invention, an iteration is carried out through each file associated with the application source code which is provided in the pre-determined file format by applying the pre-defined set of rules (ReGex rules). Firstly, each file associated with the application source code is assessed and subsequently non-text file types associated with the application source code are excluded by applying exclusion logic. The non-text file types may include, but is not limited to, image files, binary files etc. Further, the excluded file types are representative of files which does not comprise any source code reference and therefore are not assessed. The pre-defined set of rules (ReGex rules) are applied in a pre-defined order on the remaining file types after excluding the non-text file types.

In an exemplary embodiment of the present invention, firstly, anti-pattern rules are applied on the application source code files for assessing the source code for detecting the anti-patterns occurring in the source code. For example, the anti-pattern data occurring in the said source code may include, but is not limited to, http session (http(s)), session.write (s.write), session.read (s.read) etc. Secondly, further, technology stack suitability rules are applied on the application source code files. The technical stack suitability rules aids in determining the extent to which an application's technical stack may be migrated to cloud. Therefore, if the technical stack suitability is measured in percentage based on the technical stack suitability rules, then higher percentage indicates that the application's technical stack may be easily migrated to cloud. The technical stack suitability rules assess the application source code files based on a pre-defined suitability criteria. The pre-defined suitability criteria is based on the technical details of the application source code. The suitability criteria aids in determination of the technical suitability of an application for cloud migration with respect to different technical parameters. The technical stack suitability criteria may be assessed in the form of high, medium and low technical suitability criteria. For example, an application may be based on a java programming language. In the said application, one of the technical parameters may relate to java runtime with respect to other parameters. The java runtime parameter with respect to other parameters may be assigned a base weight of 6 points out of the scale of 100 points. Therefore, if an application has java runtime version less than or equal to 1.6, then suitability criteria is considered to be low and 0% of base weight (i.e. 0 points) is assigned for suitability criteria. If, the application has java runtime version equal to 1.7, then suitability criteria is considered to be medium and 50% of base weight (i.e. 3 points) is assigned for suitability criteria. If, the application has java runtime version greater than 1.7, then suitability criteria is considered to be high and 100% of base weight (i.e. 6 points) is assigned for suitability criteria. Lastly, technical stack summary rules are applied in order to generate technical summary data of the application source code. The technical summary of the application source code may include, but is not limited to, primary and supporting frameworks, third party libraries, representational state transfer (REST) interfaces, simple object access protocol (SOAP) interfaces, application details, LOC number, number of java files, number of test cases etc.

At step 404, a first report is generated. In an embodiment of the present invention, the detected anti-patterns data, the tech stack suitability criteria data and the tech stack summary data is assembled and a first report as a JavaScript Object Notation (JSON) report comprising the anti-patterns data, the tech stack suitability criteria data and the tech stack summary data is generated.

At step 406, the application source code is parsed into one or more lexical tokens. In an embodiment of the present invention, the application source code in the pre-defined file format, i.e. Zip format comprising multiple files related to the application source code is further processed. A value stream abstract syntax tree (VAST) transformer technique is utilized to iterate through each file present in the pre-defined file format of the application source code. VAST transformers are based on various programming languages, such as, but are not limited to, java based VAST transformer, XML based VAST transformer, etc. In an embodiment of the present invention, the application source code syntax characters present in each file are parsed (break) into one or more lexical tokens associated with the specific programming language by utilizing techniques such as, but are not limited to, one-hot encoding etc. Every token is configured with an application syntax type identifier. For example, the source code syntax tokens may include, but are not limited to, field tokens, declaration tokens, method expression tokens, alphabetic tokens, punctuation tokens, literal tokens, identifier tokens, separator tokens, operator tokens etc. Therefore, the lexical tokens are representative of a sequence or a string of source code syntax characters unified in a common standard format. For example, a programming language specific lexical token may be unified in a standard format comprising pre-defined number of fields such as, type field, value field, file name field and lines of code field. For instance, if a lexical token is java specific, then standard format may comprise type field as method declaration, value field as getText, file name field as x.java and line of code as 15 or if a lexical token is XML specific, then standard format may comprise type field as XML element, value field as xyz, file name field as x.xml and line of code as 12. Further, the tokenization process is agnostic of the type of programming language utilized for creation of the application source code. For example, the application source code may be in a java programming language, .Net programming language, PHP programming language etc., the tokens formed are therefore configured to a unified standard format. Further, metadata is attached with the formed source code lexical tokens for providing the context of a particular token. For example, in a java based application, a method A may be invoked by a method B, then the lexical token for method A may include meta data that specifies the invoking method as B.

At step 408, a matrix is formed based on the lexical tokens. In an embodiment of the present invention, the frequency of occurrence of every token is determined. The lexical tokens along with the frequency of occurrence is represented as a vector data type. In an embodiment of the present invention, a bag of words model is formed representing the frequency of occurrence of different types of syntax patterns. In an exemplary embodiment of the present invention, syntax patterns may include characters occurring in the sequence of standard unified format tokens. The bag of words model is used to persist the trained anti-pattern. Further, the words are bagged in the form of a matrix comprising a pre-determined number of rows and columns. The matrix is representation of a table illustrating all the similar lexical tokens bagged together with the number of frequency of their occurrence in the standard unified token vector. For example, if a token comprises an alphabetical character 'a' operator which is present in the application source code and it occurs 3 times in the standard unified token vector, then in the matrix where the character 'a' is placed, the frequency of its occurrence as number 3 is mapped to its location in the matrix. The anti-patterns occurring in the matrix are tagged against the characters present in the matrix based on a pre-defined set of anti-patterns.

At step 410, multiple anti-patterns detection models are generated and trained based on the formed matrix. In an embodiment of the present invention, in operation, machine learning technique such as, but is not limited to, natural language processing (NLP) are applied on each lexical token vector present in the matrix for determining the type of character associated with each token. Multiple anti-patterns detection models are trained and generated utilizing supervised machine learning techniques such as, but are not limited to, three-layer deep neural network (DNN) etc. based on the anti-patterns present in the matrix. The models are generated utilizing an anti-pattern library, such as, but is not limited to, tensor flow technique. The models generated are binary models. The models are representative of various anti-patterns associated with various application source codes. The trained models formed are thereafter utilized during assessment for detecting the anti-patterns occurring in the application source code. Further, the trained and generated anti-patterns detection models are stored in the storage unit for future retrieval.

At step 412, anti-patterns detection models are implemented on the application source code for anti-patterns detection and confidence factor computation. In an embodiment of the present invention, the generated and trained anti-patterns detection models are fetched from the storage unit during the assessment phase. The fetched anti-patterns detection models are utilized for detecting the anti-patterns occurring in the application source code. In an embodiment of the present invention, vectorized lexical tokens are generated based on the source code associated with the application which is being assessed. Subsequently, similarity of the syntax patterns occurring in the application source code is computed by comparing the vectorized lexical tokens of the application source code with the anti-patterns detection models for determining the anti-patterns occurring in the application source code. Therefore, a correlation is computed between the syntax patterns occurring in the application source code and the anti-patterns utilized for generating and training the anti-patterns detection models. A comparison technique, such as, but is not limited to, fuzzy match algorithm technique etc. is utilized for determining the correlation between the syntax patterns occurring in the application source codes and the anti-patterns models. Consequently, if a correlation is detected between a syntax pattern in the application source code and the anti-pattern models, then the correlated syntax pattern in the application source code is tagged as an anti-pattern and other syntax patterns for which no correlation is determined are tagged as not an anti-pattern.

Further, subsequent to computation of the correlation, a 'confidence factor' is computed. The generated and trained anti-pattern models are utilized for computing the 'confidence factor'. In an embodiment of the present invention, the computed 'confidence factor' is compared to a pre-defined threshold 'confidence factor' for tagging the correlated syntax pattern as anti-patterns. The 'confidence factor' is representative of the extent of similarity of the correlated syntax-patterns as anti-patterns and is provided in a percentage numeric form. The generated and trained models are further utilized for computing the 'confidence factor'. For example, if the threshold 'confidence factor' is pre-defined as 90% and the 'confidence factor' between the correlated syntax patterns is computed as 91%, then the correlated syntax pattern present in the application source code is tagged as an anti-pattern. If the 'confidence factor' is between 50%-80%, then there is a likely chance of the correlated syntax pattern of being an anti-pattern. However, if the 'confidence factor' is 30%, then the correlated syntax pattern is not tagged as an anti-pattern as it is quite below the threshold 'confidence factor'. Therefore, a prediction is made whether the detected anti-patterns are anti-patterns or not.

At step 414, a second report is generated. In an embodiment of the present invention, a second report as a JavaScript Object Notation (JSON) report comprising the determined anti-patterns and computed 'confidence factor' is generated.

At step 416, a third report based on the first report and the second report is generated and a fourth report based on the third is generated. In an embodiment of the present invention, the first JSON report and the second JSON report is combined. The first JSON report and the second JSON report is scanned prior to being combed in order to prevent duplication of the anti-patterns, that may have occurred in both the JSON reports. The JSON reports relates to different applications, which are programmed utilizing different computer programming languages, providing detected anti-patterns. The first and second JSON reports are assessed and an individual detailed third report is generated for every application providing the unique anti-patterns detected across the source code of the application. The third report for each application is generated in a pre-determined format such as, but is not limited to, a hypertext markup language (HTML) format. The third report provides an application level assessment view. The application level assessment for each application provides an individual report for each application. The generated third report for each application providing detected anti-patterns across each application may be viewed by the user on a dashboard. Further, the third report provides a tech stack suitability based on the technical details of the application (low, medium or high), migration complexity based on anti-patterns and severity (low, medium or high) based on the impact of an anti-pattern on an application during cloud migration (e.g. an anti-pattern which leads to failure of migration of an application to cloud is marked with high severity), non-adherence to cloud native twelve factor principles, anti-pattern 'confidence factor' and migration actionable event. In an exemplary embodiment of the present invention, a migration actionable event is generated, provided in the third report, based on the detected anti-patterns for the application source code. The migration actionable event may include, but is not limited to, a first event, a second event, a third event and a fourth event. The first event includes rehosting, in which some configuration changes may be carried out in the application source code. The second event includes replatform, in which minimum code change may be carried out in the application source code. Further, the third event includes refactor, in which significant code changes may be carried out in the application source code. Further, the fourth event includes rebuild, in which the application source code may not be reused and subsequently new application source code may be written for migrating the application source code to the cloud platform.

In another embodiment of the present invention, each individual application third report relating to the anti-patterns detected across the source code of the application is processed and a fourth report (summary report) for multiple applications providing statistics of the anti-patterns detected across individual application source code is generated. The fourth report is generated in the pre-determined format such as, but is not limited to, the hypertext markup language (HTML) format. The generated fourth report provides a portfolio level assessment view. The portfolio level assessment provides the summary report for multiple applications together. Further, the third report and the fourth report includes a detailed anti-pattern summary which further includes, but is not limited to, a file name, specific line number of the source code in which the anti-pattern may occur, an anti-pattern description and location of the file. Further, the user may review the detected anti-patterns provided in the third report and fourth report.

FIG. 5 illustrates an exemplary computer system in which various embodiments of the present invention may be implemented. The computer system 502 comprises a processor 504 and a memory 506. The processor 504 executes program instructions and is a real processor. The computer system 502 is not intended to suggest any limitation as to scope of use or functionality of described embodiments. For example, the computer system 502 may include, but is not limited to, a programmed microprocessor, a micro-controller, a peripheral integrated circuit element, and other devices or arrangements of devices that are capable of implementing the steps that constitute the method of the present invention. In an embodiment of the present invention, the memory 506 may store software for implementing various embodiments of the present invention. The computer system 502 may have additional components. For example, the computer system 502 includes one or more communication channels 508, one or more input devices 510, one or more output devices 512, and storage 514. An interconnection mechanism (not shown) such as a bus, controller, or network, interconnects the components of the computer system 502. In various embodiments of the present invention, operating system software (not shown) provides an operating environment for various softwares executing in the computer system 502, and manages different functionalities of the components of the computer system 502.

The communication channel(s) 508 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth or other transmission media.

The input device(s) 510 may include, but not limited to, a keyboard, mouse, pen, joystick, trackball, a voice device, a scanning device, touch screen or any another device that is capable of providing input to the computer system 502. In an embodiment of the present invention, the input device(s) 510 may be a sound card or similar device that accepts audio input in analog or digital form. The output device(s) 512 may include, but not limited to, a user interface on CRT or LCD, printer, speaker, CD/DVD writer, or any other device that provides output from the computer system 502.

The storage 514 may include, but not limited to, magnetic disks, magnetic tapes, CD-ROMs, CD-RWs, DVDs, flash drives or any other medium which can be used to store information and can be accessed by the computer system 502. In various embodiments of the present invention, the storage 514 contains program instructions for implementing the described embodiments.

The present invention may suitably be embodied as a computer program product for use with the computer system 502. The method described herein is typically implemented as a computer program product, comprising a set of program instructions which is executed by the computer system 502 or any other similar device. The set of program instructions may be a series of computer readable codes stored on a tangible medium, such as a computer readable storage medium (storage 514), for example, diskette, CD-ROM, ROM, flash drives or hard disk, or transmittable to the computer system 502, via a modem or other interface device, over either a tangible medium, including but not limited to optical or analogue communications channel(s) 508. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention.

We claim:

1. A system for anti-pattern detection for a computing application prior to deployment in a cloud environment, the system comprising:
    a memory storing program instructions;
    a processor configured to execute instructions stored in the memory; and
    an application assessment subsystem executed by the processor and configured to:
        apply a pre-defined set of rules on one or more applications source code, wherein the pre-defined set of rules are applied in a pre-defined order;
        apply one or more anti-pattern detection models on the one or more applications source code, wherein the anti-pattern detection models are applied for determining a correlation between one or more syntax patterns of the application source code and the anti-patterns detection models;
        detect anti-patterns associated with the one or more syntax patterns of the application source code based on the pre-defined set of rules and the anti-patterns detection models, wherein the detected anti-patterns represent unique anti-patterns; and
        generate a migration actionable event for the application source code based on the detected anti-patterns.

2. The system as claimed in claim 1, wherein the application source code is in the form of a pre-defined file format.

3. The system as claimed in claim 1, wherein the pre-defined set of rules are representative of regular expression (ReGex) rules, and wherein the ReGex rules are classified into anti-pattern rules, technical stack suitability rules and technology stack summary rules.

4. The system as claimed in claim 1, wherein the application assessment subsystem comprises a rule engine executed by the processor and configured to apply the anti-pattern rules on the application source code for assessing and detecting the anti-patterns occurring in the application source code; applying the technical stack suitability rules on the application source code based on a pre-defined suitability criteria for determination of the technical suitability of an application for cloud migration; and applying technical stack summary rules on the application source code for generating technical summary data of the application source code.

5. The system as claimed in claim 4, wherein the technical summary data of the application source code may comprise at least primary and supporting frameworks, third party libraries, representational state transfer (REST) interfaces, simple object access protocol (SOAP) interfaces, application details, LOC number, number of java files and number of test cases.

6. The system as claimed in claim 1, wherein the application assessment subsystem comprises a model engine executed by the processor and configured to generate and train multiple anti-patterns detection models based on multiple anti-patterns associated with multiple applications source code.

7. The system as claimed in claim 6, wherein the model engine comprises a value stream abstract syntax tree (VAST) transformer unit executed by the processor and configured to parse the application source code syntax patterns into one or more lexical tokens associated with a programming language based on a one-hot encoding, and wherein the lexical tokens are representative of a string of source code syntax patterns in a unified standard format.

8. The system as claimed in claim 6, wherein the model engine comprises a source code vectorization unit executed by the processor and is configured to determine the frequency of occurrence of the lexical token based on a bag of words model in the form of a matrix.

9. The system as claimed in claimed in claim 8, wherein the source code vectorization unit is configured to tag the anti-patterns occurring in the matrix against source code characters associated with the lexical tokens present in the matrix.

10. The system as claimed in claim 6, wherein the model engine comprises a model training unit executed by the processor and configured to process the matrix comprising the anti-patterns for generating and training multiple anti-pattern detection models based on a three-layered deep neural network (DNN) technique.

11. The system as claimed in claim 6, wherein the model engine comprises an inference unit executed by the processor and configured to determine the correlation based on at least a fuzzy match technique, and wherein if a correlation is determined between the syntax pattern in the application source code and the anti-pattern detection models, then the correlated syntax pattern of the application source code is tagged as 'an anti-pattern' and syntax patterns for which no correlation is determined are tagged as 'not an anti-pattern'.

12. The system as claimed in claim 11, wherein the inference unit is configured to compute a confidence factor, and wherein the confidence factor is representative of extent of similarity of the correlated syntax pattern as anti-patterns.

13. The system as claimed in claim 12, wherein the model engine comprises a classification unit executed by the processor and configured to compare the computed confidence factor to a pre-defined threshold confidence factor for tagging the correlated syntax pattern as anti-patterns.

14. The system as claimed in claim 1, wherein the migration actionable event includes at least a first event, a second event, a third event and a fourth event, and wherein the first event, the second event, the third event and the fourth event includes rehost, replatform, refactor and rebuild respectively.

15. A method for anti-pattern detection for a computing application prior to deployment in a cloud environment, wherein the method is implemented by a processor executing instructions stored in a memory, the method comprising:
  applying, by the processor, a pre-defined set of rules on one or more applications source code, wherein the pre-defined set of rules are applied in a pre-defined order;
  applying, by the processor, one or more anti-pattern detection models on the one or more applications source code, wherein the anti-pattern detection models are applied for determining a correlation between one or more syntax patterns of the application source code and the anti-patterns detection models;
  detecting, by the processor, anti-patterns associated with the one or more syntax patterns of the application source code based on the pre-defined set of rules and the anti-patterns detection models, wherein the detected anti-patterns represents unique anti-patterns; and
  generating, by the processor, a migration actionable event for the application source code based on the detected anti-patterns.

16. The method as claimed in claim 15, wherein the application source code is in the form of a pre-defined file format.

17. The method as claimed in claim 15, wherein the pre-defined set of rules are representative of regular expression (ReGex) rules, and wherein the ReGex rules are classified into anti-pattern rules, technical stack suitability rules and technology stack summary rules.

18. The method as claimed in claim 17, wherein the anti-pattern rules are applied on the application source code for assessing and detecting the anti-patterns occurring in the application source code; the technical stack suitability rules are applied on the application source code based on a pre-defined suitability criteria for determination of the technical suitability of an application for cloud migration; and technical stack summary rules are applied on the application source code for generating technical summary data of the application source code.

19. The method as claimed in claim 18, wherein the technical summary data of the application source code may comprise at least primary and supporting frameworks, third party libraries, representational state transfer (REST) interfaces, simple object access protocol (SOAP) interfaces, application details, LOC number, number of java files and number of test cases.

20. The method as claimed in claim 15, wherein multiple anti-patterns detection models are generated and trained based on multiple anti-patterns associated with multiple applications source code.

21. The method as claimed in claim 15, wherein the application source code syntax patterns are parsed into one or more lexical tokens associated with a programming language based on a one-hot encoding, and wherein the lexical tokens are representative of a string of source code syntax patterns in a unified standard format.

22. The method as claimed in claim 20, wherein the frequency of occurrence of the lexical token is determined based on a bag of words model in the form of a matrix.

23. The method as claimed in claim 22, wherein the anti-patterns occurring in the matrix are tagged against source code characters associated with the lexical tokens present in the matrix.

24. The method as claimed in claim 23, wherein the matrix comprising the anti-patterns is processed for generating and training multiple anti-pattern detection models based on a three-layered deep neural network (DNN) technique.

25. The method as claimed in claim 15, wherein the correlation is determined based on at least a fuzzy match technique, and wherein if a correlation is determined between the syntax pattern in the application source code and the anti-pattern detection models, then the correlated syntax patterns of the application source code is tagged as 'an anti-pattern' and syntax patterns for which no correlation is determined are tagged as 'not an anti-pattern'.

26. The method as claimed in claim 25, wherein a confidence factor is computed, and wherein the confidence factor is representative of extent of similarity of the correlated syntax pattern as anti-patterns.

27. The method as claimed in claim 25, wherein the computed confidence factor is compared to a pre-defined threshold confidence factor for tagging the correlated syntax pattern as anti-patterns.

28. The method as claimed in claim 15, wherein the migration actionable event includes at least a first event, a second event, a third event and a fourth event, and wherein the first event, the second event, the third event and the fourth event includes rehost, replatform, refactor and rebuild respectively.

29. A computer program product comprising:
  a non-transitory computer-readable medium having computer-readable program code stored thereon, the computer-readable program code comprising instructions that, when executed by a processor, cause the processor to:
    apply a pre-defined set of rules on one or more applications source code, wherein the pre-defined set of rules are applied in a pre-defined order;
    apply one or more anti-pattern detection models on the one or more applications source code, wherein the anti-pattern detection models are applied for determining a correlation between one or more syntax patterns of the application source code and the anti-patterns detection models;
    detect anti-patterns associated with the one or more syntax patterns of the application source code based on the pre-defined set of rules and the anti-patterns detection models, wherein the detected anti-patterns represents unique anti-patterns; and generate a migration actionable event for the application source code based on the detected anti-patterns.

\* \* \* \* \*